Feb. 5, 1946.  A. PIPPING  2,394,476
AUTOMATIC WEIGHING DEVICE
Filed Feb. 29, 1944  2 Sheets-Sheet 1

INVENTOR
ALF PIPPING
BY Clark & Ott
ATTORNEYS

Feb. 5, 1946. A. PIPPING 2,394,476
AUTOMATIC WEIGHING DEVICE
Filed Feb. 29, 1944 2 Sheets-Sheet 2

INVENTOR
ALF PIPPING
BY Clark + Ott
ATTORNEYS

Patented Feb. 5, 1946

2,394,476

UNITED STATES PATENT OFFICE 2,394,476

AUTOMATIC WEIGHING DEVICE

Alf Pipping, Bloomfield, N. J.

Application February 29, 1944, Serial No. 524,367

3 Claims. (Cl. 249—19)

This invention has general reference to weighing apparatus and is directed more particularly to an automatic device for successively measuring by weight predetermined small quantities of powdered substances such as chemicals and medicines.

The invention broadly comprehends an entirely automatic device which functions to rapidly effect successive measurement by weight of predetermined quantities of powdered substances, the actuation of which device is accomplished gravitationally by the weight of the material flowing through the same so that the operator has both hands free to position and remove the receptacles employed for the packaging of the material being weighed by the device.

As a further feature, the invention resides in a device of the indicated character in which means is provided for setting the weighing mechanism to vary the weight of the predetermined quantities to be measured and for regulating the speed of flow of the material in accordance therewith.

More particularly, the invention is directed to a novel gravity actuated escapement means which functions to insure instantaneous release and discharge of the measured quantity of material within the very narrow or precise weight limits required so as to preclude undesirable or harmful deviation from the predetermined quantity specified.

Other objects in view are to provide a device of the character set forth which is comparatively simple in its construction and mode of operation, which may be economically produced and maintained at maximum working efficiency for long periods of time without requiring frequent adjustments, repairs or replacement of parts.

With the above enumerated and other objects in view, the invention is set forth in greater detail in the following specification, particularly pointed out in the appended claims and illustrated in the accompanying drawings, in which:

Figure 1:
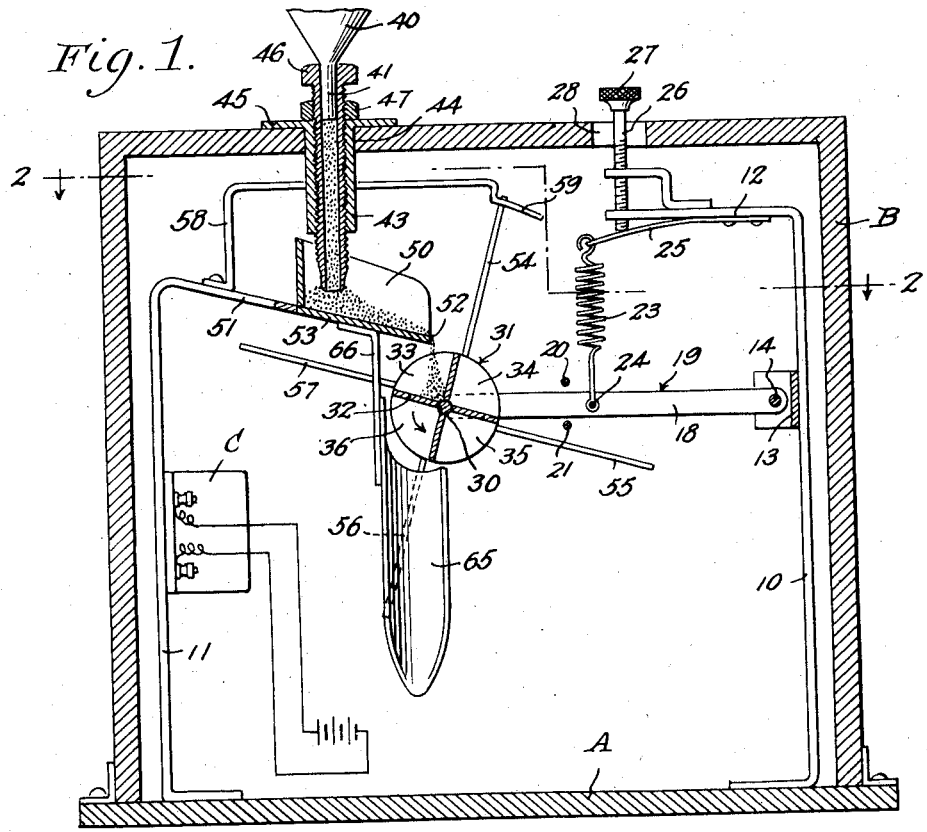
Fig. 1 is a vertical sectional view through a weighing device constructed in accordance with the invention the same being taken approximately on the line 1—1 of Fig. 2.

Referring to the drawings by characters of reference, A designates the base of the weighing device and B the cover thereof which is detachably associated with the base in any desired manner so as to provide a housing for enclosing and protecting the working parts of the device.

As shown, the base A has secured thereto and extending upwardly therefrom a pair of standards 10 and 11 which are disposed wholly within the confines of the cover B when the same is associated with the base. In the form of the invention shown in Figs. 1, 2 and 3, the standard 10 is formed with an inwardly directed angular terminal 12 and has secured thereto below said terminal a substantially L-shaped bracket 13 which has mounted thereon a horizontally disposed rock shaft 14, the conical extremities of which are journaled in adjustable needle point bearing screws 16 threadedly engaging the bracket. The rock shaft 14 has secured thereto a pair of spaced parallel arms 17 and 18 which extend radially outward therefrom in the same direction and which are disposed substantially horizontal to constitute a scale beam 19 fulcrumed by the rock shaft 14 for swinging movement in a vertical plane and projecting in a direction toward the standard 11. The vertical swinging movement of the scale beam 19 is limited by upper and lower stop pins 20 and 21 which protrude inwardly from the leg 22 of the L-shaped bracket 13 and into the path of movement of the scale beam arm 17.

In this form of the invention, the scale beam 19 is controlled by a coiled contractile balance spring 23, the lower end of which is anchored to a pin 24 which protrudes inwardly from the scale beam arm 17, the point of anchorage being at the center of gravity of the scale beam both longitudinally and transversely thereof so as to minimize friction on the needle point bearings. The upper end of the spring 23 is attached to a leaf spring 25 anchored to the underside of the upper terminal 12 of the standard 10. In order to regulate the tension of the balance spring 23, an adjusting screw 26 is threaded through the terminal 12 and engages the leaf spring 25 for effecting the raising and lowering of the free end thereof to increase and decrease the tension and hence the quantity of material necessary to depress the outer end of the scale beam 19. The upper headed end 27 of the adjusting screw 26 protrudes from the housing through an opening 28 in the cover B so that the spring tension may be set from the outside.

The outer ends of the scale beam arms 17 and 18 have journaled therein for rotation a shaft 30 which has secured thereto for free rotation therewith a rotary element or bucket wheel 31 which is thus located at the free end of the scale beam 19 and between and spaced from the arms 17 and 18. The bucket wheel 31 is subdivided by radial blades 32 into a plurality of circumferentially spaced compartments or buckets, four being shown in the present disclosure and designated respectively by the reference characters 33, 34, 35 and 36.

The powdered substance or material to be weighed by the device is supplied to a hopper 40 supported above the cover B with the outlet end 41 thereof positioned within an externally threaded tube 42 engaging within an internally threaded boss 43 which extends through an opening 44 in the cover B and secured to and depending from a plate 45 secured to the upper surface of the cover. The upper end of the tube 42 is provided with a wrench engaging head 46 for turning thereof to adjust the same vertically for regulating the speed of flow of the material therethrough and a lock nut 47 is threadedly engaged with the tube for maintaining the adjustment.

The tube 42 is designed to gravitationally feed the material from the hopper 40 and the lower end of said tube is arranged within the confines of the uppermost end portion of a delivery chute 50 supported by the angularly disposed upper terminal 51 of the standard 11 with the lower end edge 52 at the lower outlet end of the inclined bottom wall 53 of the delivery chute located above the bucket wheel 31 and slightly to the side of the axial center thereof which is remote from the scale beam 19.

Mechanism is provided for successively disposing and retaining each of the compartments or buckets 33, 34, 35 and 36 of the bucket wheel in a predetermined location beneath the outlet end 52 of the delivery chute 50 so that when charged with material from the delivery chute the bucket wheel will be overbalanced to turn in a counterclockwise direction as indicated by the arrow in Fig. 1. The mechanism for carrying out this function consists of a plurality of radial arms corresponding in number to the number of compartments or buckets on the bucket wheel and which arms are designated by the reference characters 54, 55, 56 and 57, the same being secured so as to turn with the bucket wheel and which arms are preferably of a relatively fine gage slightly flexible wire having angularly disposed terminal portions. The said mechanism also includes a detent means which consists of an arm 58 secured to the upper terminal 51 of the standard 11, the free end of which arm 58 is provided with a downwardly offset terminal 59 which is formed with a transverse notch 60 and a laterally oblique free end edge 61 disposed in the path of movement of the angular terminal portions of the radial arms 54, 55, 56 and 57 so that when the arms engage with said oblique end edge 61 they are deflected thereby and directed into the notch 60. As each arm is engaged with said notch it functions to locate one of the buckets under the outlet end 52 of the delivery chute 50 to receive the material discharged therefrom.

A discharge chute 65 is located below the bucket wheel 31 for receiving the material dumped from the buckets and said discharge chute is carried by a supporting arm 66 secured to and depending from the underside of the delivery chute 50. The forward lower end of the discharge chute 65 protrudes through an opening 67 in the front wall of the cover B where the operator may conveniently position the containers in juxtaposition thereto for filling the same.

In order to insure proper feeding of the powdered material and to positively effect the lateral flexing of the terminal portions of the radial arms and their engagement with the notch 60, suitable means is provided for vibrating or agitating the standard 11 such as an electric vibrator C which is mounted upon said standard. It will thus be apparent that both chutes as well as the detent which are carried by the standard are constantly agitated or vibrated, which also serves to reduce friction on detent arms during their downward movement to release position.

Figure 2:
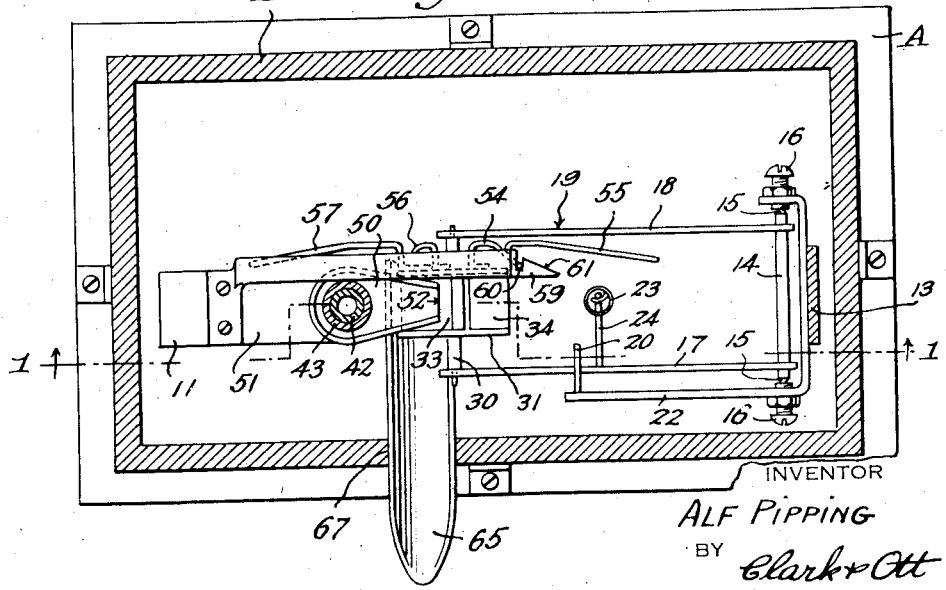
Fig. 2 is a sectional plan view taken approximately on the line 2—2 of Fig. 1.
Figure 3:
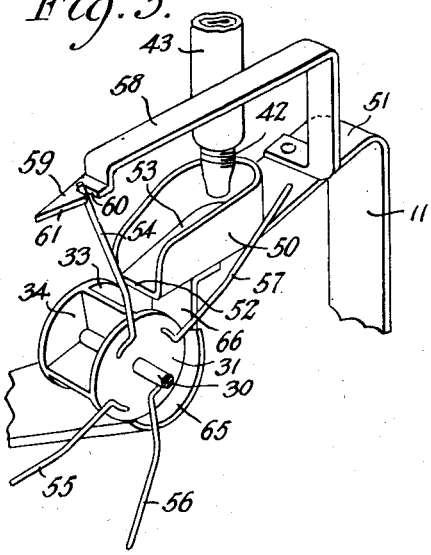
Fig. 3 is a fragmentary perspective view of the bucket wheel, delivery chute and detent means.

In use and operation of the weighing device, with the parts in the position shown in Figs. 1, 2 and 3, it will be observed that the terminal of the radial arm 54 is engaged in the notch 60 of the detent element 59 and the bucket 33 is receiving material being discharged from the delivery chute 50. When an amount of material has entered the bucket 33 to equal a predetermined weight, the scale beam 19 will move downwardly a sufficient distance to pull the upper end of the radial arm 54 below the lower surface of the detent terminal 59 thus releasing the arm 54. Due to the fact that the bucket 33 had been so positioned by the arm 54 that the preponderance of the weight of the material therein is disposed at one side of the axis of rotation of the bucket wheel 31, said wheel will be instantly turned in a counterclockwise direction as shown by the arrow in Fig. 1. This results in the dumping of the contents of the bucket 33 into the upper end portion of the discharge chute 65 permitting the scale beam 19 and the bucket wheel to move upwardly when relieved of the weight of the material, while the momentum of the wheel causes the same to continue to turn in a counterclockwise direction until the succeeding arm 55 engages with the oblique end edge of the detent terminal 59 causing it to be deflected into the notch 60 aided by the flexibility of the arm and the vibrations imparted to the detent terminal 59. When thus engaged within the notch 60, the arm 55 locates and retains the succeeding bucket 34 in proper position to receive the material from the delivery chute 50 and the weighing operations previously described are repeated as long as material is supplied to the delivery chute 50.

The material received by the discharge chute 65 is gravitationally discharged from the free lower end thereof aided by the vibrations imparted thereto and under which lower end containers are successively placed by the attendant. By adjusting the screw 26 upwardly to increase the tension of the scale beam spring 23, the predetermined quantity to be measured by each weighing operation is increased and by adjusting said screw downwardly the tension of said scale beam spring is decreased to decrease the predetermined amount measured by each weighing operation. In order to coincide with the increase and decrease of the measured quantities to be weighed the feed tube 42 is correspondingly raised and lowered to increase or decrease the speed of flow of the material.

Figure 4:
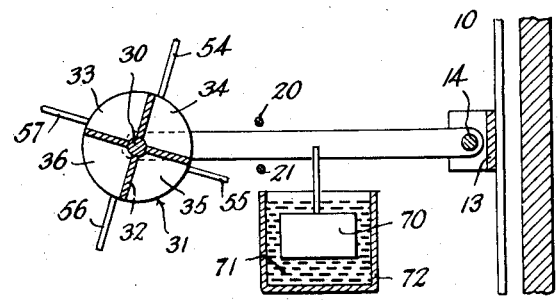
Fig. 4 is a fragmentary sectional view of a modification of the control means for the scale beam.
Figure 5:
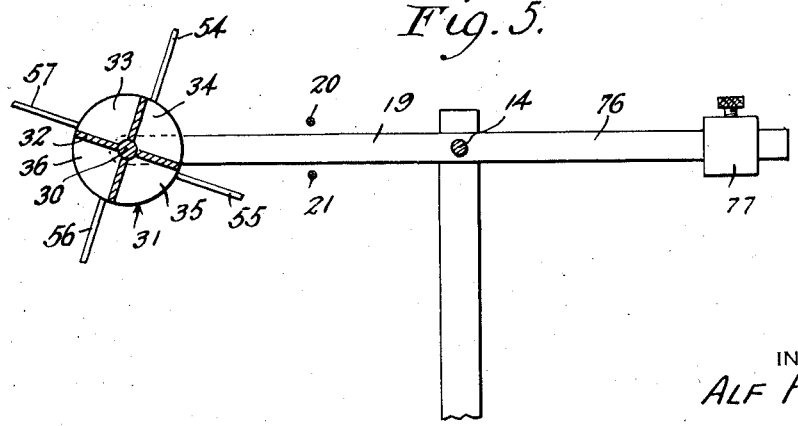
Fig. 5 is a still further modification of the scale beam control means.

The scale beam 19 may be controlled by equivalent means other than the spring 23 as illustrated in the forms of the invention shown in Figs. 4 and 5. In the form illustrated in Fig. 4, the scale beam is disclosed as connected with and controlled by a float element 70 arranged in a fluid such as mercury 71 contained by an open receptacle 72 suitably supported beneath the scale beam and connected therewith.

In the form shown in Fig. 5, the scale beam is provided with a weight arm 76 extending from the fulcrum 14 in an opposite direction to the scale beam arm 19 and said weight arm has an adjustable counterbalancing weight 77.

What is claimed is:

1. In an automatic weighing device, a rotary bucket wheel mounted to turn on a horizontal axis and having a plurality of circumferentially spaced buckets opening radially outward, a chute for delivering to the bucket wheel the material to be weighed, circumferentially spaced radially disposed flexible arms carried by said bucket wheel and corresponding in number to the number of buckets, a fixed detent element having a forwardly directed laterally oblique edge intersecting the path of movement of and toward which the outer terminal portions of the radial arms are adapted to be moved, said detent element being formed with a side opening notch disposed in rear of and intersecting the oblique edge and adapted to receive the arm terminal portions after deflection by said oblique edge for successively disposing each bucket beneath the delivery chute, and a support for said bucket wheel movable downwardly under a predetermined weight of material fed into the receiving bucket for lowering and releasing from under the detent element the outer terminal of the radial arm to permit the weight of the material in the bucket to turn said wheel to dump the weighed material therefrom and to effect the deflection and engagement of the succeeding radial arm with the detent notch so as to dispose and retain the succeeding bucket in receiving position.

2. A weighing device as set forth in claim 1 and including a discharge chute arranged beneath the bucket wheel for receiving and dispensing the weighed material, a standard constituting a common support for the delivery and discharge chutes and the detent element and means for vibrating said standard to insure feeding of the material and to prevent frictional adherence of the arms with the detent element while effecting positive engagement of said arms with the notch thereof and disengagement of the same therefrom during the downward movement of said arms for release of the bucket wheel.

3. In an automatic device for successively weighing quantities of powdered material including a scale beam fulcrumed on a horizontal axis for limited swinging movement in a vertical plane, a rotary element having circumferentially spaced receiving buckets journaled on a horizontal axis at the free end of the scale beam, a delivery chute having a discharge end located above the rotary element adapted to gravitationally feed the powdered material to the buckets, superposed means for supplying material to the chute, a fixed detent element having a forwardly directed oblique edge and a transversely extending notch located at the rear of said oblique edge, circumferentially spaced elongated flexible arms corresponding to the number of buckets and secured to said rotary element and extending radially outwardly therefrom, said arms being adapted to have camming engagement with said oblique edge and to successively engage in said notch for respectively locating the buckets beneath the discharge end of the delivery chute for receiving a quantity of the material in said buckets, said rotary element being lowered by the weight of the material received therein respectively to thereby release the arms from engagement with said notch so as to permit the turning of the rotary element by the weight of the material for dumping the same from the buckets, the rising and a rotary movement of said rotary element after the dumping effecting the engagement of the succeeding arm with the notch in said detent element.

ALF PIPPING.